United States Patent
Kamiya (10) Patent No.: US 11,503,165 B2
(45) Date of Patent: Nov. 15, 2022

(54) METHOD OF SETTING PARAMETERS USED TO ADJUST QUALITY OF SCANNED IMAGE, INFORMATION PROCESSING APPARATUS EMPLOYING SUCH A METHOD, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventor: Nobuyuki Kamiya, Anjo (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 76 days.

(21) Appl. No.: 17/130,765

(22) Filed: Dec. 22, 2020

(65) Prior Publication Data
US 2021/0203788 A1    Jul. 1, 2021

(30) Foreign Application Priority Data
Dec. 27, 2019  (JP) .............................. JP2019-237773

(51) Int. Cl.
*H04N 1/00* (2006.01)
*H04B 1/04* (2006.01)
*H04N 1/04* (2006.01)

(52) U.S. Cl.
CPC ..... *H04N 1/00018* (2013.01); *H04N 1/00005* (2013.01); *H04N 1/00413* (2013.01); *H04N 1/04* (2013.01)

(58) Field of Classification Search
None
See application file for complete search history.

(56) References Cited

U.S. PATENT DOCUMENTS

2019/0082078 A1* 3/2019 Nakamura ........... H04N 1/4097
2019/0149701 A1* 5/2019 Yamamoto ............... H04N 1/62
                                                        358/505

FOREIGN PATENT DOCUMENTS

JP       2019-054361 A    4/2019

* cited by examiner

*Primary Examiner* — Andrew H Lam
(74) *Attorney, Agent, or Firm* — Scully, Scott, Murphy & Presser, PC (57) ABSTRACT

There is provided an information processing apparatus configured to obtain criterion data, which is reference image data, by executing a adjustment parameter determining program, obtain evaluation data which is image data scanned by a scanner, generate a plurality of pieces of comparison data by adjusting the evaluating data using a plurality of adjustment parameters different from each other, respectively, associate each comparison data with an adjustment parameter used to generate the comparison data, and display the criterion data and the plurality of pieces of comparison data in a list. When a selecting operation of selecting one from the plurality of pieces of comparison data is performed, the information processing apparatus determines an adjustment parameter for the scanner based on the adjustment parameter associated with the selected comparison data.

16 Claims, 7 Drawing Sheets

METHOD OF SETTING PARAMETERS USED TO ADJUST QUALITY OF SCANNED IMAGE, INFORMATION PROCESSING APPARATUS EMPLOYING SUCH A METHOD, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2019-237773 filed on Dec. 27, 2019. The entire subject matter of the application is incorporated herein by reference.

BACKGROUND

Technical Field

The present disclosures relate to a method of setting adjustment parameters used to adjust quality of an image read by a scanner, an information processing apparatus employing such a method and a non-transitory computer-readable recording medium therefor.

Related Art

Conventionally, there has been known a technique in which adjustment parameters used to adjust quality of an image read by a scanner are set in advance. According to the technique, quality of a scanned image which is obtained as a result of scanning is adjusted in accordance with the adjustment parameters, thereby image data having higher quality being output.

SUMMARY

According to the above-described conventional technique, when the adjustment parameters are to be set, a user repeatedly executes an operation of making the scanner perform scanning and visually checking the scanning result, with changing the adjustment parameters to determine values with which an ideal scanning result is obtained. It is troublesome for the user to repeatedly perform the above operation.

According to aspects of the present disclosure, there is provided a non-transitory computer-readable recording medium for an information processing apparatus, which has a display, an operation part and a controller. The recording medium containing computer-executable programs causes, when executed by the controller, the information processing apparatus to perform a first obtaining process of obtaining criterion data which is image data to be used as a criterion of image adjustment, a second obtaining process of obtaining evaluation data which is image data scanned by a scanner, a generating process of generating a plurality of pieces of comparison data by performing an image process of adjusting the evaluation data, the plurality of pieces of comparison data being generated using different adjustment parameters, respectively, an associating process of associating each of the plurality of pieces of comparison data generated by the generating process with adjustment parameter used in the image process of generating each of the plurality of pieces of comparison data, a displaying process of displaying a list including the criterion data and the plurality of pieces of comparison data on the display, and, when a selecting operation of selecting at least one selected data from among the plurality of pieces of comparison data is performed through the operation part, a determining process of determining a scanner-use adjustment parameter, which is an adjustment parameter for the scanner, based on an associated adjustment parameter associated with the at least one selected data, the at least one selected data being comparison data selected from among the plurality of pieces of comparison data, the associated adjustment parameter being the adjustment parameter which is associated with the selected data by the associating process.

According to aspects of the present disclosure, there is provided an information processing apparatus comprising a display, an operation part, and a controller. The controller is configured to perform a first obtaining process of obtaining criterion data which is image data to be used as a criterion of image adjustment, a second obtaining process of obtaining evaluation data which is image data scanned by a scanner, a generating process of generating a plurality of pieces of comparison data by performing an image process of adjusting the evaluation data, the plurality of pieces of comparison data being generated using different adjustment parameters, respectively, an associating process of associating each of the plurality of pieces of comparison data generated by the generating process with adjustment parameter used in the image process of generating each of the plurality of pieces of comparison data, a displaying process of displaying a list including the criterion data and the plurality of pieces of comparison data on the display, and, when a selecting operation of selecting at least one selected data from among the plurality of pieces of comparison data is performed through the operation part, a determining process of determining a scanner-use adjustment parameter, which is an adjustment parameter for the scanner, based on an associated adjustment parameter associated with the at least one selected data, the at least one selected data being comparison data selected from among the plurality of pieces of comparison data, the associated adjustment parameter being the adjustment parameter which is associated with the selected data by the associating process.

DETAILED DESCRIPTION OF THE EMBODIMENT

Hereinafter, referring to the accompanying drawings, an illustrative embodiment of the present disclosures will be described.

Figure 1:
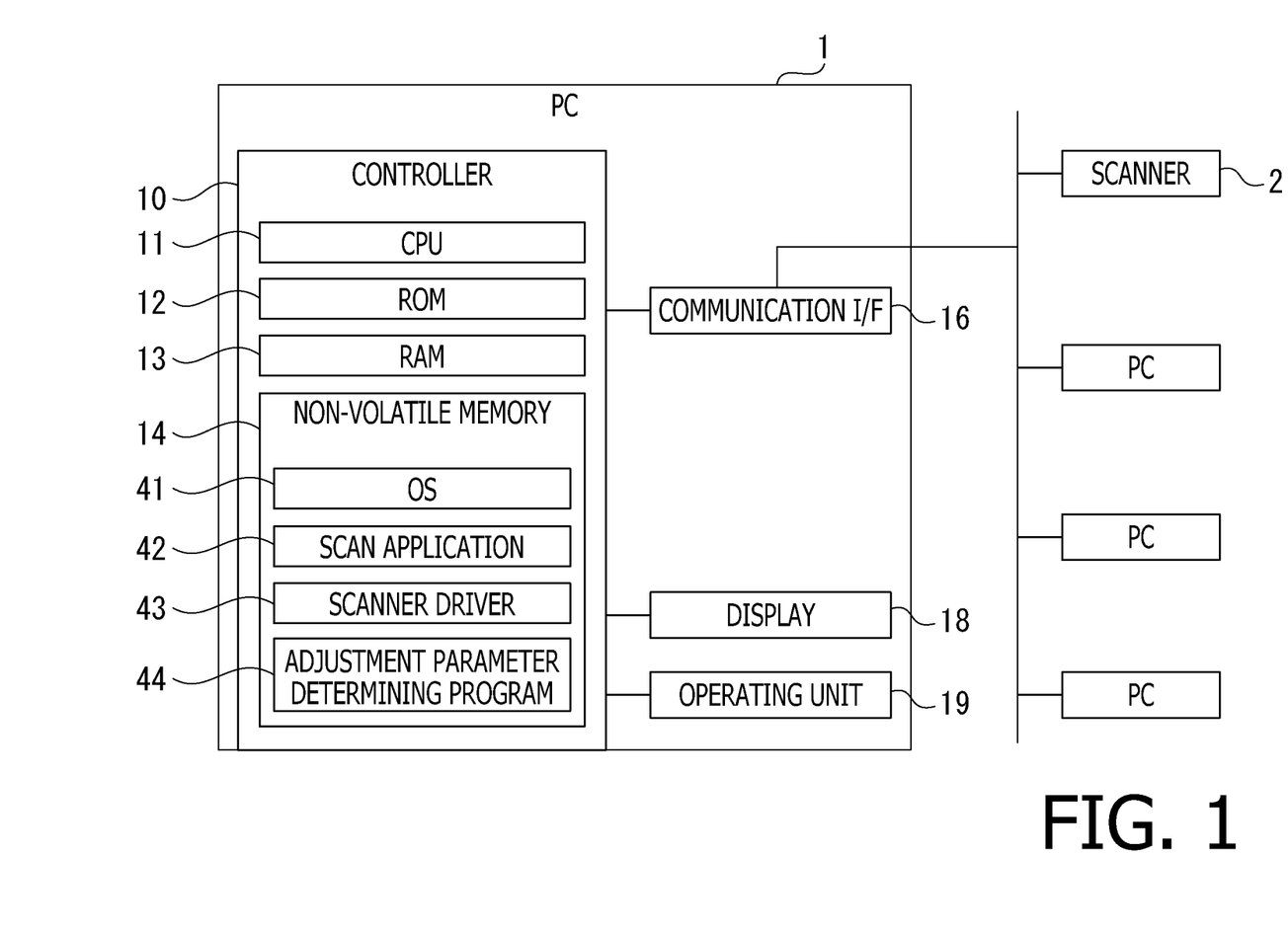
FIG. 1 is a block diagram showing an electrical configuration of a PC according to the present disclosures.

As shown in FIG. 1, a personal computer (hereinafter referred to as a "PC") 1 according to an embodiment of the present disclosures is communicably connected to a scanner 2 and is configured to execute a program. It is noted that such a program is realized by computer-executable instructions stored in a non-transitory computer-readable recording medium. The PC 1 is an example of an information processing device. The information processing device may be, for example, a smartphone or a tablet computer. The scanner 2 is configured to scan an image of a document based on, for example, a command received from the PC 1, generate scan data representing the scanned image, and transmit the scan data to the PC 1. The scanner 2 does not need to be limited to a dedicated machine for scanning, but may be a copy machine or a multifunction machine having a scanning function. It is noted that the scanner 2 according to the present embodiment is capable of scanning a color image, but the scanner 2 does not need to be limited to a device configured to scan the color image but may be a device configured to scan only a monochromatic image.

The PC 1 according to the present embodiment includes a controller 10 including a CPU 11, a ROM 12, a RAM 13, and a non-volatile memory 14, as illustrated in FIG. 1. The PC 1 further includes a communication IF (interface) 16, a display 18, and an operating unit 19, which are electrically connected to the controller 10. The controller 10 in FIG. 1 is a generic term including hardware and software used to control the PC 1, not necessarily representing a single piece of hardware existing in the PC 1.

The CPU 11 configured to execute various kinds of processes in accordance with a program read from the ROM 12 or the non-volatile memory 14 and/or based on the user's operation. The CPU 11 is an example of a computer. The ROM 12 stores a startup program to start the PC 1. The RAM 13 is used as a work area when various processes are executed or as a storage area to temporarily store data. The non-volatile memory 14 is, for example, an HDD or a flash memory, and is used as an storage area to store programs such as various application programs (hereinafter, referred to as "applications"), data such as image data or document data, and various settings.

The ROM 12, the RAM 13 and the non-volatile memory 14 are examples of a memory. Further, when the CPU 11 is provided with a CPU buffer, the CPU buffer is also an example of the memory. An example of the memory does not need to be limited to an HDD built in the PC 1, but may be any storage medium readable/writable by the CPU 11. A computer-readable storage medium is a non-transitory medium. The non-transitory medium includes, in addition to the above examples, a recording medium such as a CD-ROM, DVD-ROM or the like. The non-transitory medium is also a tangible medium. On the other hand, an electric signal carrying programs downloaded from a server on the Internet or the like is a computer-readable signal medium, which is one kind of computer-readable media, but is not categorized as the non-transitory computer-readable storage medium.

The communication IF 16 includes hardware used to communicate with an external device (e.g., the scanner 2) through a network such as a LAN or the Internet. A communication standard employed by the communication IF 16 is Ethernet®, etc. A communication mode of the communication IF 16 may be wired or wireless. A connection method between the PC 1 and the scanner 2 may be a USB connection.

The display 18 includes hardware configured to display a screen indicating information for the user. The operating unit 19 includes hardware that receives an operation by the user. That is, the operation unit 19 includes, for example, a keyboard, a mouse and/or a trackball. In place of, or in addition to a combination of the display 18 and the operating unit 19, hardware having both an input function and an output function such as a touch panel may be employed.

As shown in FIG. 1, in the non-volatile memory 14 of the PC 1, various programs including an OS (operating system) 41, a scan application 42 a scanner driver 43, and an adjustment parameter determining program 44 are stored. The OS 41 is, for example, Microsoft Windows®, macOS® or Linux®. A part of the OS 41 may be stored in the ROM 12.

The scan application 42 is configured to receive various instructions related to the scanning. The scan application 42 receives, through the operating unit 19, for example, designation of a scanner to be used, an instruction to execute a scan, designation of a file format and a storing location of a file when the scan data is stored. Optionally, the scan application 42 may receive an editing instruction of the scan data.

The scanner driver 43 is a program that communicates with the scanner 2 to control the operation of the scanner 2. The scanner driver 43 corresponding to a model of the scanner 2 is prepared by a manufacturer of the scanner 2. When the scanner 2 is designated and a scan execution instruction is received, the scan application 42 starts the scanner driver 43 corresponding to the scanner 2.

The scanner driver 43 is configured to receive the scan execution instruction from the scan application 42 or the like, cause the scanner 2 to execute scanning, and acquires scan data that is a scanning result by the scanner 2. Further, the scanner driver 43 is configured to receive setting of an adjustment parameter related to the scanning using the scanner 2, for example, in accordance with an instruction from the user. The scanner driver 43 adjusts the scan data by image processing using the set adjustment parameters, and provides the scan application 42 or the like with the adjusted scan data.

The adjustment parameter includes at least one item (e.g., a plurality of items) and is a parameter that does not depend on a characteristic performance of the scanner 2. The plurality of hems included in the adjustment parameter differ depending on whether the scan data is data representing a color image, data representing a grayscale image, or data representing a monochrome image. The plurality of items included in the adjustment parameter for the color images include, for example, brightness, contrast, and highlight. On the other hand, the plurality of items of the adjustment parameter of the grayscale image or the monochrome image does not include, for example, the highlight.

The adjustment parameter determining program 44 is configured to determine the adjustment parameter to be used by the scanner driver 43. The adjustment parameter determining program 44 is executed, for example, when the scanner 2 is newly introduced or when the introduction of a new scanner 2 is considered. The adjustment parameter determining program 44 is an example of a program.

As shown in FIG. 1, the scanner 2 of the present embodiment is assumed to be connected to a plurality of PCs via a network and shared by the plurality of PCs. For, example, the adjustment parameter determining program 44 is executed in the PC 1 by an administrator of the scanner 2 or a designer of a system including the scanner 2, prior to usage of the scanner 2 in the respective PCs. Thus, the adjustment parameter suitable for the scanner 2 is determined in advance. The PC 1 outputs the determined adjustment parameters to the PCs in a form usable by each PC.

Each PC using the scanner 2 can obtain the adjustment parameter output from the PC 1. In each PC, the scan application 42 and the scanner driver 43 are installed, and the scanner driver 43 of each PC is configured to adjust the scan data received from the scanner 2 using the obtained adjustment parameter. As a result, each PC can have the scan data after adjustment in response to an execution instruction of scanning by the scanner 2. Each PC using the scanner 2 is an example of a second apparatus. The PC 1 configured to execute the adjustment parameter determining program 44 may not be included in the system after the start of operation.

Next, processes in accordance with the adjustment parameter determining program 44 performed by the PC 1 will be described. The following processes and the processing steps of the flowchart are basically processing of the CPU 11 in accordance with instructions described in the program. That is, the processes such as "judgment," "extract," "select," "calculate," "determine," "specify," "obtain," "receive," "control" and the like in the following descriptions represent processing by the CPU 11. The processing by the CPU 11 also includes a hardware control using APIs of the OS of the PC 1. In this specification, the operation according to each program will be described with omitting the description of the OS. That is, in the following description, an expression "the program B controls the hardware C" may mean "the program B controls the hardware C using the API of the OS." In addition, the processes of the CPU 11 according to an instruction written in the program may be described in a simplified manner, for example, as "performed by the CPU 11." In addition, the processes of CPU 11 according to the instruction described in the program may be expressed in a simplified manner such that "the program A performs" with omitting the term "CPU 11."

It is noted that "obtain" is used to mean that a request is not necessarily be made. That is, a process of the CPU 11 to receive data without request is included in a concept of that "the CPU 11 obtains data." In the present specification, "data" is represented by a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be expressed conceptually such that "the CPU 11 determines whether event B or not based on information A." Furthermore, a process of the CPU 11 to determine whether information indicates event B or event C may be expressed conceptually such that "the CPU 11 determines whether event B or event C based on information A."

Referring to the flowchart of FIG. 2, the adjustment parameter determining process in the PC 1 of the present embodiment will be described. The adjustment parameter determining process is executed by the CPU 11 of the PC 1 when an instruction to execute the adjustment parameter determining program 44 is received. The "user" in the following description of the adjustment parameter determining process is an administrator or a system designer who executes the adjustment parameter determining program 44, and may be different from a user of the scanner 2 after the system operation is started. In addition, in the following description, an expression " . . . image" is sometimes used to mean "image data of . . . image."

In the adjustment parameter determining process, the CPU 11 firstly obtains criterion data (S101). The process in S101 is an example of a first obtaining process. The criterion data is image data to be a target of the adjustment (e.g., the image data scanned by the scanner 2 will be adjusted so as to approach the criterion data), and is specified by the user. In a usage environment in which the same type of document is repeatedly scanned, if another scanner is newly introduced, for example, the scanner is replaced with a newly purchased one, it may not be preferable that the scanning results change significantly due to introduction of the new scanner. In this case, the user designates, as the criterion data, for example, image data obtained by a scanning operation of a previously used scanner (in the case where the scanner 2 is newly introduced, the image data read by a scanner that was used before the scanner 2 is introduced). The criterion data may be stored in advance in the PC 1 or may be obtained from an external device such as a server.

The CPU 11 transmits, to the scanner 2, a scanning command instructing to perform scanning (S102). In S102, the user sets, in the scanner 2, the same type of document (e.g., the same document) as the document used when generating the criterion data, and inputs an instruction for obtaining the same type of the criterion data. If the image to be obtained at the time of operation of the scanner 2 is a color image, the user prepares image data of the color image as the criterion data and inputs an instruction to perform color scanning. The CPU 11 transmits a scanning command to the scanner 2 in accordance with the user's instruction to perform the color scanning. If the image to be obtained at the time of operation of the scanner 2 is a grayscale image, the user prepares image data of the grayscale image as the criterion data and instructs the scanner 2 to perform the grayscale scanning. If the image to be obtained at the time of operation of the scanner 2 is a monochrome image, the user prepares image data of the monochrome image as the criterion data, and instructs the scanner 2 to perform the monochrome scanning.

When receiving the scanning command, the scanner 2 executes a scanning operation to scan an image of the set document, and transmits the obtained scan data to the PC 1. Thus, the CPU 11 obtains the scan data by receiving the same from the scanner 2 (S103). The process in S103 is an example of a second obtaining process. The scan data acquired in S103 is an example of evaluation data.

Next, the CPU 11 executes an initial parameter generating process (S104), which is a process of generating initial parameters of the respective items included in the adjustment parameter used to adjust the scan data obtained from the scanner 2.

Figure 3:
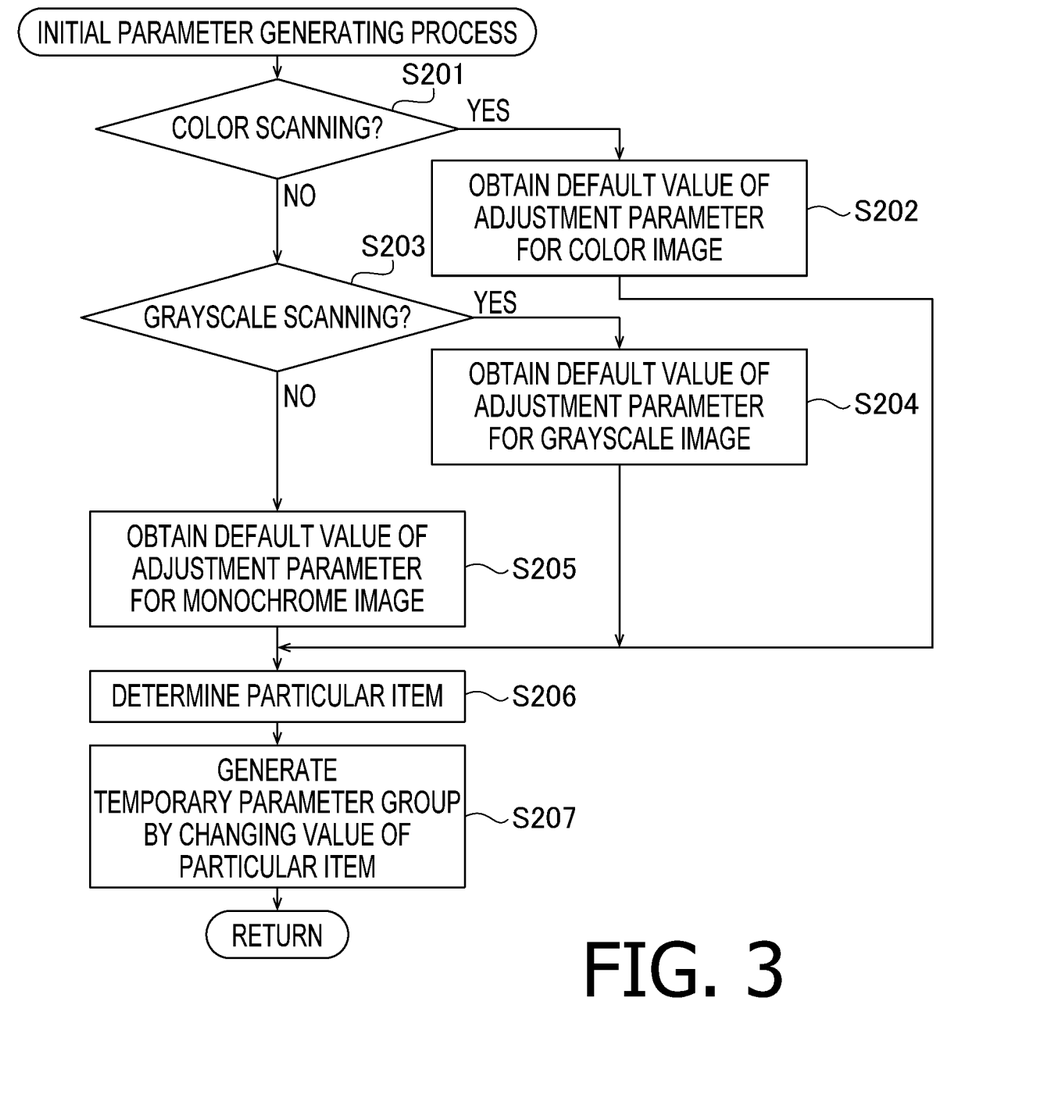
FIG. 3 is a flowchart illustrating an initial parameter generating process.

The initial parameter generating process will be described with reference to the flowchart of FIG. 3. In the first parameter generating process, the CPU 11 determines whether or not the instruction received from the user in S102 is an instruction to perform the color scanning (S201). When it is determined that the instruction to perform the color scanning is received (S210: YES), the color scanning is performed by the scanner 2, and the PC 1 obtains the scan data of the color image from the scanner 2. In this case, the adjustment parameter for the color image is a target adjustment parameter to be determined in the adjustment parameter determining process.

When the CPU 11 determines that the instruction is to scan the color image (S201: YES), the CPU 11 obtains a default value for each item included in the adjustment parameter for the color image (S202). The process S202 is an example of a default value obtaining process. It is noted that the default value is set, for example, to the scanner driver 43 or the adjustment parameter determining program 44 in advance. When the adjustment parameter at the time of generating the criterion data can be obtained, the obtained adjustment parameter may be regarded as the default value.

Figure 4:
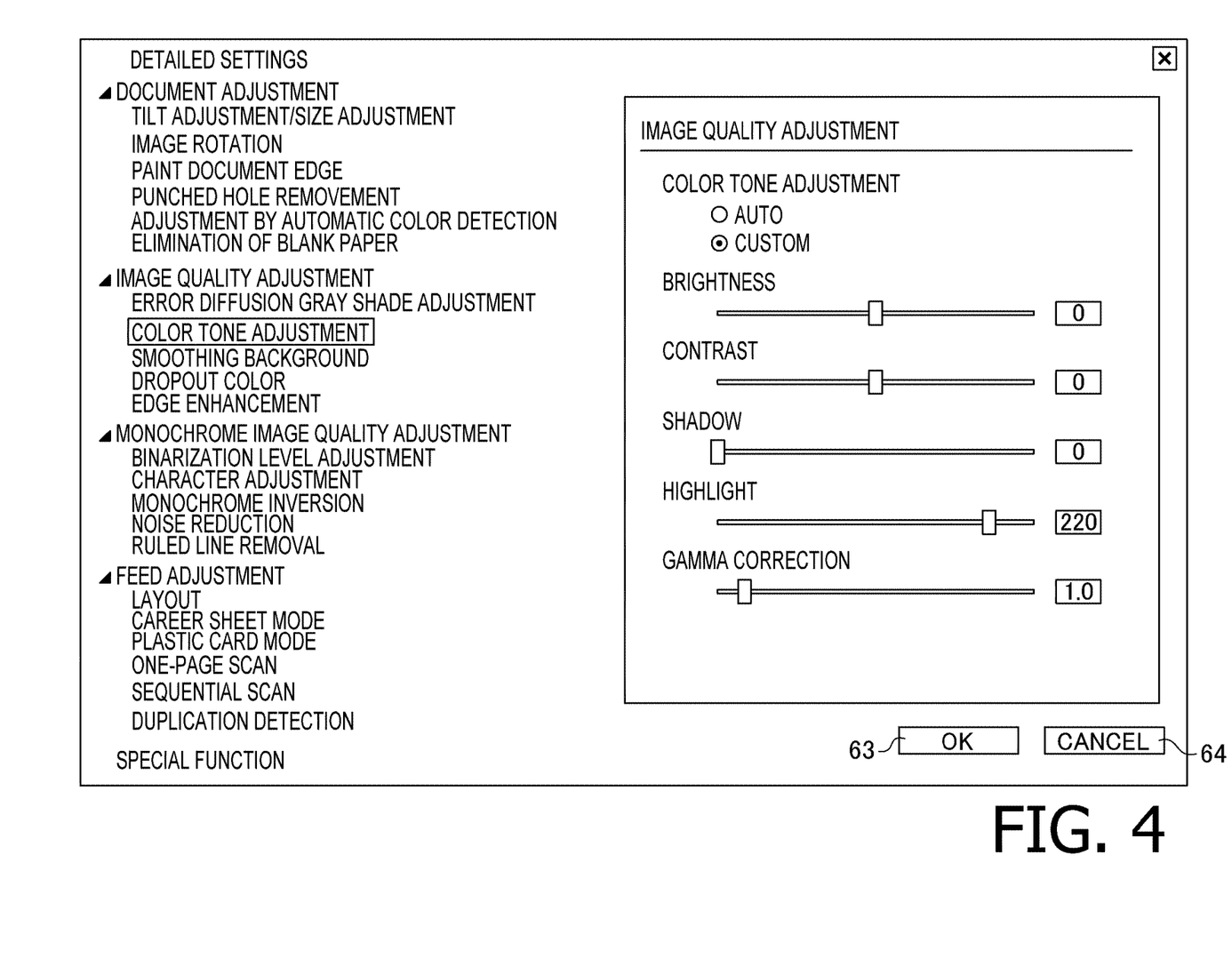
FIG. 4 is an example of a parameter group used to adjust quality of a color image.

The adjustment parameter for the color image includes, for example, items of brightness, contrast, shadow, highlight, and gamma correction as shown in FIG. 4. These are items to adjust tone of the color image. The items to adjust the tone are examples of a first item. It is noted that the adjustment parameter for the color image also includes items which are not related to the tone. The items not related to the tone include, for example, items related to image processing such as noise elimination, ground color elimination, and the like. The items not related to the tone are examples of a second item.

When it is determined that the instruction is not to perform the color scanning (S201: NO), the CPU 11 determines whether the instruction is to perform the grayscale scanning (S203). When the scanner 2 has a function of performing the grayscale scanning, a grayscale image is generated by the scanner 2 by the PC 1 transmitting commands instructing grayscale scanning to the scanner 2 at S102 of the adjustment parameter determining process, and the PC 1 can obtain the grayscale image data from the scanner 2. If the scanner 2 is a device having only a color scanning function, the PC 1 can obtain the grayscale image data by deleting, at the scanner 2 or the PC 1, color information from the color image scanned by the scanner 2.

When the CPU 11 determines that the instruction is to perform the grayscale scanning (S203: YES), the CPU 11 obtains a default value for each item included in the adjustment parameter for the grayscale image (S204). The process S204 is an example of a default value obtaining process. When the instruction to scan the grayscale image is received, the adjustment parameter for the grayscale image is the target adjustment parameter to be determined. The adjustment parameter for the grayscale image includes items related to brightness and contrast.

When it is determined that the adjustment parameter is not also the instruction to scan the grayscale image (S203: NO), the CPU 11 obtains default values for the respective items included in the adjustment parameter for the monochrome image (S205). The process S205 is an example of a default value obtaining process. The item included in the adjustment parameter for the monochrome image is a binarization threshold.

When the instruction of the monochrome scanning is received, the PC 1 causes the scanners 2 to perform the grayscale scanning to obtain the grayscale image. Then, the PC 1 obtains the monochrome image by binarizing the obtained image data of the grayscale image. When the monochrome scanning instruction is received in S102 of the adjustment parameter determining process, the scan data obtained in S103 of the adjustment parameter determining process is image data after binarization using the default value obtained in S205.

After execution of any of S202, S204, S205, the CPU 11 determines one of the items of the adjustment parameter as a particular item (S206). The particular item is an item of which a value is to be varied in order to generate multiple pieces of comparison data. The multiple pieces of comparison data are multiple pieces of image data each being the scan data adjusted using a different adjustment parameter.

When the CPU 11 determines the adjustment parameter for the color image or the grayscale image, for example, a brightness item is set as the particular item. In particular, when determining the adjustment parameter for the color image, the CPU 11 determines items to adjust the tone, and determines items not related to the tone thereafter. When the adjustment parameter for the monochrome image is determined, the binarization threshold is the particular item. The determination of the particular item may be performed automatically in the adjustment parameter determining process or may be performed by the user's instruction. For example, if it is possible to obtain an item of which the assigned value has been changed from the default value when the criterion data is generated, the obtained item may be used as the particular item.

In S207, the CPU 11 assigns various values to the particular item determined in S206 to generate a temporary parameter group including multiple temporary parameters (in the present embodiment, eight temporary parameters), terminates the initial parameter generating process, and returns to the adjustment parameter determining process. The values assigns to the particular item of the respective temporary parameters generated in S207 are different from each other. When each of the multiple temporary parameters has items other than the particular item, default values are assigned to the items other than the particular item. Thus, the values assigned to the other items are the same among the multiple temporary parameters.

In S207, the CPU 11 varies the values to be assigned to the particular item, for example, centering around a reference value. In the present embodiment, the default value is set as the reference value. When the particular item is the brightness item, the CPU 11 generates eight types of temporary parameters. For example, the eight types of the temporary parameters are generated by assigning the default value, four different values greater than the default value, and three different values smaller than the default value to the brightness item.

When each of the criterion data and the scan data is data representing the monochrome image, that is, when the adjustment parameter for the monochrome image is to be determined, the reference value may be determined based on a ratio of the black pixels to all the pixels. In this case, the CPU 11 calculates, for example, the ratio of (the number of) the black pixels to all the pixels in the criterion data and the ratio of the black pixels to all the pixels in the scanned data, and obtains a binarization threshold value, as an intermediate value, with which the ratio of black pixels to all the pixels is a value therebetween instead of obtaining the default values in S205. Then, the CPU 11 generates the plurality of temporary parameters by assigning the binarization threshold values centered around the intermediate value in S207.

In S207, since the temporary parameter group is a parameter group generated at the first time, the CPU 11 generates the multiple temporary parameters by assigning widely varied values to the particular item. For example, a range between the maximum or minimum value that the value of a particular item can take and the default value is divided into four or three parts, respectively, to generate each temporary parameter with the value of each division range as the value assigned to the particular item.

Figure 2:
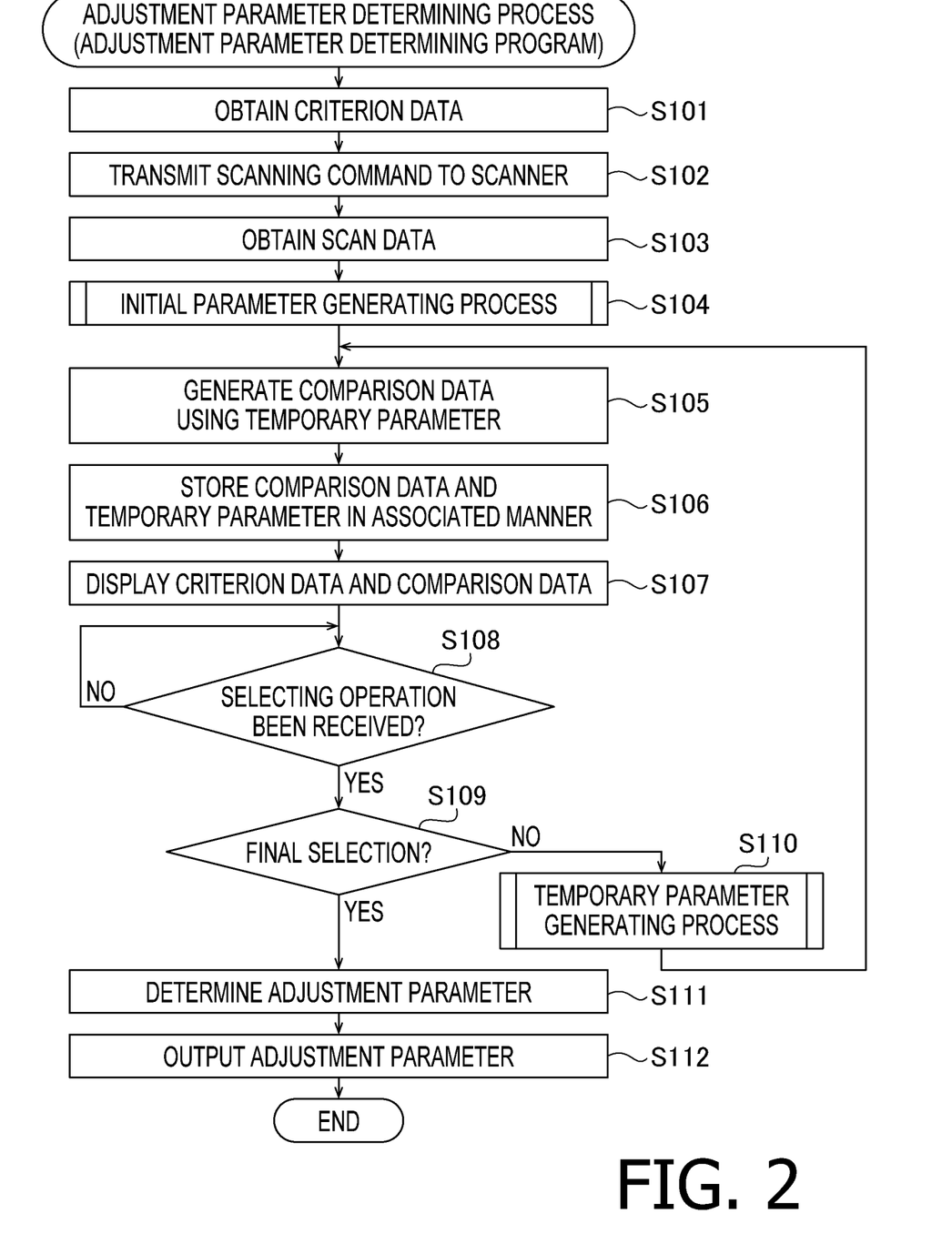
FIG. 2 is a flowchart illustrating an adjustment parameter determining process.

Returning to the adjustment parameter determining process of FIG. 2, the CPU 11 adjusts the scanned data using the determined temporary parameters, and creates a plurality of pieces of comparison data (S105) after the initial parameter generating process of S104. The process of S105 is an example of a generating process. For example, since the eight temporary parameters are generated in the first parameter generating process, the CPU 11 creates eight different pieces of comparison data in S105. Then, the CPU 11 stores the information associating the plurality of pieces of comparison data with the plurality of temporary parameters used to generate corresponding comparison data, respectively, in the RAM 13 (S106). The process of S106 is an example of an associating process.

The CPU 11 displays on the display 18 a list screen showing a list of the image of the criterion data and images of the plurality of pieces of the comparison data generated in S105 (S107). The process of S107 is an example of a displaying process.

Figure 5A:
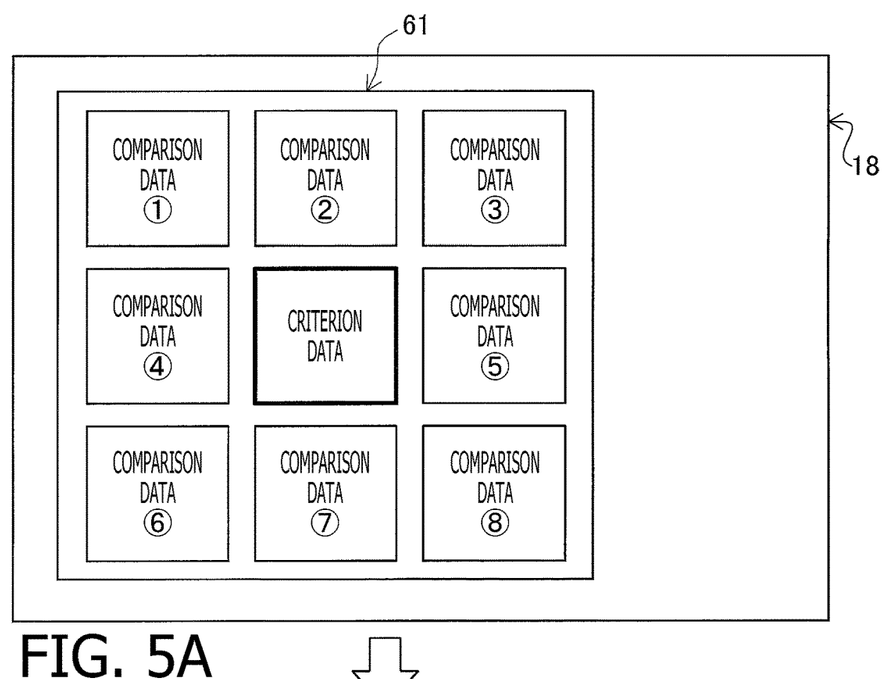
FIG. 5A and FIG. 5B show examples of a list screen.
Figure 5B:
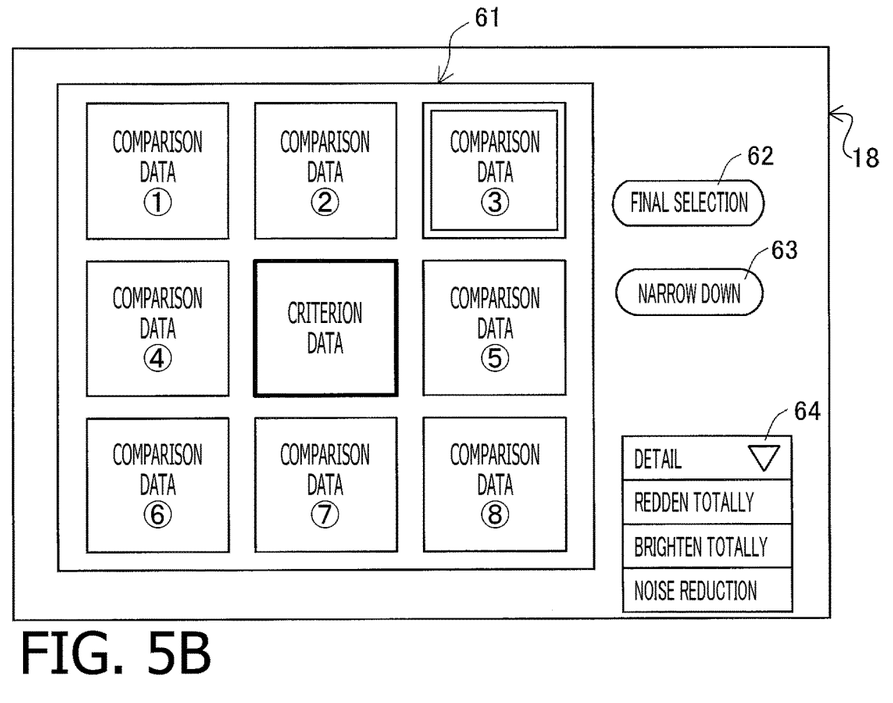

Examples of the list screen are shown in FIGS. 5A and 5B. The list screen 61 is, as shown in FIG. 5A, a screen in which a window is divided into three sections vertically and horizontally, respectively, and the image of the criterion data is arranged in the center, and images of the plurality of pieces of comparison data are arranged in the periphery. For example, the respective comparison data may be arranged in the order of the values (e.g., in ascending order or descending order) assigned to the particular item, may be arranged so that the difference of the values assigned to the particular item between the adjacent pieces of comparison data becomes large, or may be arranged randomly. By displaying the plurality of pieces of comparison data around the criterion data, it becomes easy to recognize the difference from the criterion data and the differences among the plurality of pieces of comparison data.

Then, the CPU 11 receives, through the operating unit 19, user's selection, among the images represented by the plurality of pieces of comparison data displayed on the list screen 61, which (i.e., the user's selection) is closest to the image of the scanning result desired by the user. Specifically, the CPU 11 determines whether or not the user's selection has been received (S108). When receiving, for example, a click or a tap on the image being displayed (S108: YES), the CPU 11 determines that the image displayed at the position where the user's operation is performed, has been selected. If it is determined that the selection operation is not performed (S108: NO). The CPU 11 waits until the selection operation is performed.

When it is determined that the selection operation has been performed (S108: YES), the CPU 11 determines whether the selection operation is an operation of a final selection (S109). The comparison data corresponding to the image selected by the selection operation is an example of selected data.

When, for example, the selection operation is performed on the comparison data (3), the CPU 11 displays, as shown in FIG. 5B, the selected image with a double frame, and further displays a final selection button 62 for the user to instruct the final selection and a narrowing button 63 for the user to instruct further narrow the images.

The final selection is an instruction to adopt the temporary parameter used to generate the currently selected image as the adjustment parameter to be used by the scanner 2 in operation. The narrowing is an instruction to further narrow choices for the comparison data for better adjustment, although the selected image is the best (for example, the selected image is the closest to the user's desired image) among the images currently displayed. FIG. 5B shows an example in which a detailed menu 64 enabling the user to enter a more detailed adjustment instruction is displayed. The detailed menu 64 is not necessarily be provided. Optionally, a button enabling a user to enter cancellation of the selection may be provided.

In the selection process in S108, the CPU 11 may also receive the selection of two or more images. In such a case, when there are multiple images which are equally preferable, the user can select a plurality of images among the multiple images. When the multiple images are selected, an image is adjusted so as to being an intermediate image of the multiple images (e.g., the adjustment parameter is set to an intermediate value of the temporary parameter corresponding to the selected multiple images). According to the present embodiment, when the multiple images are selected, the CPU 11 displays the list window 61 without associated with the final selection button 62, or with associated with the final selection button 61 in an unselectable state.

When it is determined that the narrowing instruction is received instead of the final selection (S109: NO), the CPU 11 executes a temporary parameter generating process (S110). The temporary parameter generating process is processing to generate a temporary parameter that is further narrowed based on the comparison data of the selected image.

Figure 6:
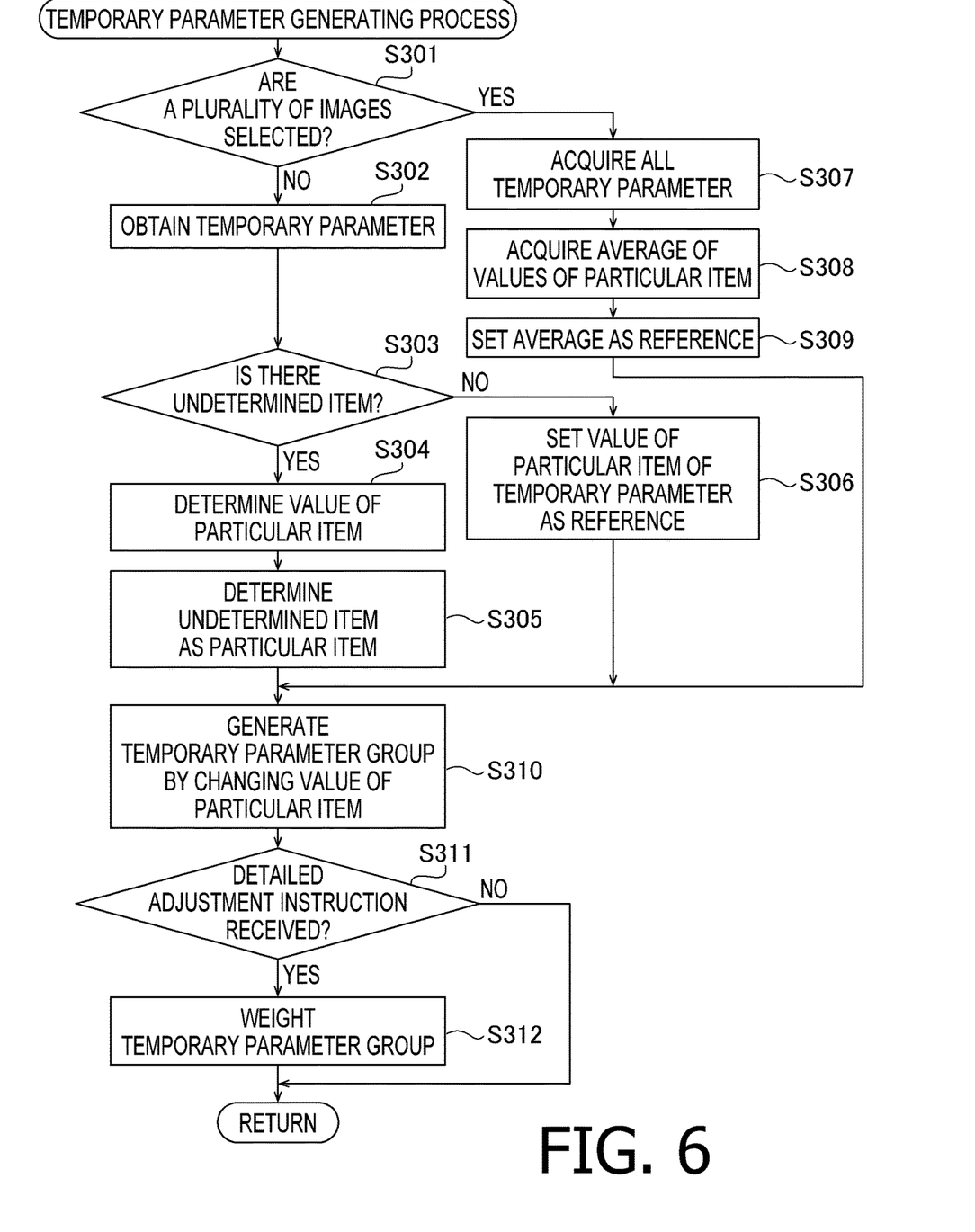
FIG. 6 is a flowchart illustrating a temporary parameter generating process.

The temporary parameter generating process will be described with reference to FIG. 6. In S301, the CPU 11 determines whether multiple images have been selected in the selection operation received in S108. When it is determined that the multiple images are not selected but one image is selected (S301: NO), the CPU 11 obtains the temporary parameter stored in association with the comparison data of the selected image (S302). The temporary parameter obtained in S302 is an example of an associated adjustment parameter.

Then, the CPU 11 determines whether there are undetermined item(s) (i.e., item(s) of which value(s) are not determined) in addition to the current particular item (S303). The undetermined item is, for example, an item among the plurality of items of the adjustment parameter and other than the particular item of which a value is determined in S206. When it is determined that there are the undetermined items (S303: YES), the CPU 11 determines, in S304, the value of the current particular item to the value included in the temporary parameter obtained in S302. Thereby, the value of the current particular item is determined. Then, the CPU 11 sets one of the undetermined items as a new particular item (S305). When there are multiple undetermined items, the CPU 11 may decide the following particular item according to a predetermined order or may receive the user's selection of the particular item.

When it is determined that there is no undetermined item (S303: NC)), the CPU 11 does not change the particular item, but sets the value to be assigned to the particular item to the value assigned to the particular item included in the temporary parameter obtained in S302 as the reference value used to generate the temporary parameter group next time so that the value assigned to the current particular item is further narrowed (S306).

When it is determined that multiple images have been selected (S301: YES), the CPU 11 obtains the temporary parameters stored in association with the comparison data of the selected images, respectively (S307). The temporary parameters obtained in S307 are examples of the associated adjustment parameter.

Next, the CPU 11 obtains an average value of the values assigned to the particular items included in all the obtained temporary parameters (S308), and uses the obtained average value as the reference value to generate the next temporary parameter group (S309). Since the multiple images have been selected, it is likely that the user wishes further narrowing of the values assigned to the particular item, and the CPU 11 generates the next temporary parameter group without changing the particular item. It is noted that, an intermediate value may be obtained instead of the average value in S308.

After execution of S305, S306 or S309, the CPU 11 generates, in S310, a temporary parameter group including a plurality of (in this embodiment, eight types of) temporary parameters by varying the value to be assigned to the particular item as in S207 of the initial parameter generating process. Incidentally, when S310 is executed after S305, the CPU 11 varies the value to be assigned to the particular item to be centered around the presently assigned value (e.g., the default value). On the other hand, when S310 is executed after S306 or S309, the CPU 11 generates the temporary parameter group by varying the value to be assigned to the particular item centered around the determined reference value and within a smaller range compared to the range within which the values assigned to the previous temporary parameter group vary.

Next, the CPU 11 determines whether a detailed adjustment instruction has been received (S311). For example, items of the detailed adjustment are displayed as options in the detailed menu 64 shown in FIG. 5B, and the CPU 11 is configured to receive an instruction by one of the displayed options being selected by the user. The displayed options include an instruction of the detailed adjustment to be applied when the selected image is adjusted, such as "redden totally" or "brighten totally." The contents of the detailed adjustment instruction are examples of a weighting value.

When it is determined that the detailed adjustment instruction has been received (S311: YES), the CPU 11 applies, to each temporary parameter of the temporary parameter group generated in S310, the weighting value corresponding to the received instruction (S312). By weighting the adjustment result of the selected image using the weighting value, it becomes easier to obtain an image close to an ideal image for the user. Incidentally, the CPU 11 may cause the display 18 to display an image in which the weighting value is taken into account in S312 and the user to check the image.

After execution of S312 or when it is determined that the detailed adjustment instruction has not been received (S311: NO), the CPU 11 terminates the temporary parameter generating process and returns to the adjustment parameter determining process.

The description will return to the adjustment parameter determining process shown in FIG. 2. In the adjustment parameter determining process, after the temporary parameter determining processing (S110), the CPU 11 executes the above-described processes S105-S109 again. That is, the CPU 11 generates a plurality of pieces of comparison data by adjusting the scan data using the plurality of determined temporary parameters, respectively, and stores the plurality of temporary parameters in association with the plurality of pieces of comparison data, respectively. Further, the CPU 11 displays an image of the plurality of pieces of comparison data and the image of the criterion data, and receives a selecting of the comparison data. When the received selection is not the final selection, the CPU 11 further executes the temporary parameter generating process and receives a selecting from images generated based on new temporary parameters, respectively.

When it is determined that the final selection has been received (S109: YES), the CPU 11 determines the temporary parameter associated with the comparison data selected in the final selection as the adjustment parameter (S111). S111 is an example of a determining process, and the adjustment parameter determined in S111 is an example of an adjustment parameter for a scanner. The CPU 11 may set the adjustment parameter determined in S111 as the adjustment parameter of the scanner driver 43 of the PC 1.

Then, the CPU 11 outputs the determined adjustment parameter (S112), and terminates the adjustment parameter determining process. S112 is an example of an outputting process. In the adjustment parameter determining program 44 of the present embodiment, for example, an output mode, for example, an output destination of the adjustment parameter or a file format of the output file, is determined based on a user instruction. The output mode may be determined in advance and set in the adjustment parameter determining program 44, or the output mode may be determined based on the user input before execution of S112.

The adjustment parameter determined in the adjustment parameter determining process of the present embodiment is used by the scanner driver 43 executed by each PC that shares the scanner 2. For example, the CPU 11 generates a file in which each item of the adjustment parameter is written in a format readable by each PC, and outputs the generated file such that another PC can use the file. The output mode may be a mode in which the PC 1 directly transmits the file to each PC, or a mode in which the file is received by each PC via another device.

Specifically, when the PC 1 and each PC can be connected with each other via a network or the like, the CPU 11 transmits the generated file to each PC via the network. In this case, according to the destination PC, the CPU 11 generates a file in a format that can be read by the destination PC and that can be supported by a file transmitting function between the PC 1 and the destination PC in a format which can be transmitted by the file transmission function). The CPU 11 may generate a different file for each destination PC. In this case, S112 is also an example of a file transmitting process.

Further, the PC 1 may generate the file in a format that can be react by each PC and store the file in a location that can be accessed from each PC such as a local server or a Web server. If the Web server is running on the PC 1, the file may be output to the folder which is to be accessed by the Web server in a format that can be used by the Web server. Each PC accesses the storage location of the file before using the scanner 2, downloads the file, and sets the adjustment parameter included in the file as the adjustment parameter of the scanner driver 43 of own apparatus. By storing the adjustment parameter as the file, the PC using the scanner 2 can read and use the file when necessary.

Figure 7:
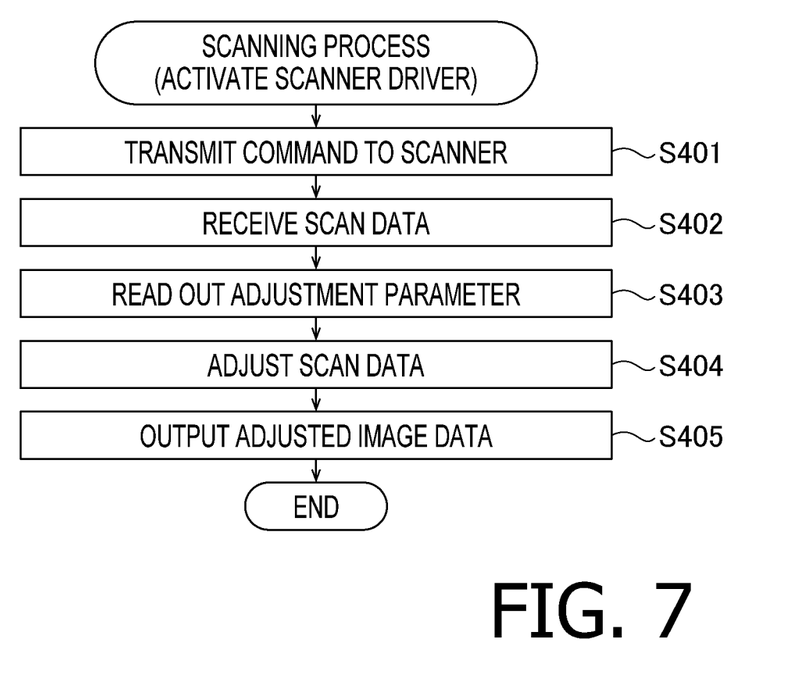
FIG. 7 is a flowchart illustrating a scanning process.

Next, a scanning process in each PC (see FIG. 1) using the scanner 2 in the system of the present embodiment will be described with reference to FIG. 7. This scanning process is executed by the CPU of each PC in response to activation of the scanner driver 43. The scanner driver 43 is activated when a scanning instruction using the scanner 2 is received through a user operation on the scan application 42 or the like. The following describes a case that the scanning process is executed by the CPU 11 of the PC 1.

In the scanning process, the CPU 11 generates a scanning command and transmits the generated scanning command to the scanner 2 (S401). S401 is one example of a command transmitting process. The scanning command is a command that causes the scanner 2 to scan a document. The CPU 11 generates the scanning command based on the scanning instruction received from the scan application 42 or the like. Upon receiving the scanning command, the scanner 2 executes the scanning process in accordance with the received scanning command, obtains the scan data, and transmits the obtained scan data to the PC 1.

The CPU 11 receives the scanned data from the scanner 2 (S402). Then, the CPU 11 reads out the adjustment parameter determined in the adjustment parameter determining process (S403). The adjustment parameter may be read out from a local server or the like each time a scanning process is executed, or may be read out at the time of the first execution or before the scan is executed and set as a bookmark setting or a default value of the scanner driver 43.

The CPU 11 adjusts the scan data received in S402 using the adjustment parameter read out in S403 (S404). S404 is an example of an adjusting process. Further, the CPU 11 outputs the adjusted image data to the scan application 42 or the like (S405), and terminates the scanning process. The CPU 11 adjusts the scanned data using the adjustment parameter determined in the adjustment parameter determining process, and thus it is a highly possible that image data close to the user's desired image can be obtained.

If the scanner 2 has a function of performing adjustment based on the adjustment parameter, the adjustment may be performed by the scanner 2. In this instance, the CPU 11 includes the adjustment parameter determined by the adjustment parameter determining process in the scanning command to be transmitted to the scanner 2. When receiving the scanning command including the adjustment parameter, the scanner 2 adjusts the image data of the scanning result of scanning the image of the document using the adjustment parameter and transmits the adjusted image data to the PC 1 as the scan data. When the CPU 11 transmits the scanning command including the adjustment parameter, the CPU 11 does not need to adjust the received scan data.

As described above in detail, by executing the adjustment parameter determining program 44 of the present embodiment, the PC 1 generates the plurality of pieces of comparison data obtained while assigning different values to each item included in the adjustment parameter based on one piece of scan data, displays the plurality of pieces comparison data in a list with the criterion data, and receives the user's selection. Based on the image selected by the user's operation, an adjustment parameter to be used to scan is determined. By displaying the list of the plurality of pieces of comparison data, the user can easily find the comparison data close to the criterion data and can easily select the comparison data used to determine the adjustment parameter. Further, since the adjustment parameter is determined from one piece of scan data, the scanning process may be performed once, and the number of times of scanning may be reduced. Therefore, it can be expected to reduce troublesome for the user when setting the adjustment parameter used to scan.

In the present embodiment, the adjustment parameter determined by the adjustment parameter determining program 44 can be output to a file, or can be transmitted to each PC that shares time scanner 2. This makes it possible to use the adjustment parameter when each PC receives a scanning instruction to execute scanning using the scanner 2, thereby improving convenience for a user using each PC.

Further, in this embodiment, since the generating and selecting of the comparison data can be repeatedly executed, it is possible to bring the adjustment parameter closer to the ideal value for the user's desired image. In particular, in the present embodiment, when multiple items are included in the adjustment parameter, a value of one item of the adjustment parameter is varied as a value of the particular item, and values of the remaining items are fixed to generate the plurality of pieces of comparison data. Therefore, the difference among images depending on the values of the particular item becomes clear, and it is easy for the user to find the ideal value of the particular item. Furthermore, since values of multiple items are determined sequentially, it is easy to bring a value of each items to the ideal value for the user's desired image.

Further, in the present embodiment, when the scan data is image data of a color image, an item relating to a color tone is determined first. Since the difference in the user's preferences of the color tone is large, by making the user select the comparison data, it is easier to bring the value of the item closer to the ideal value. Further, in the present embodiment, since the plurality of comparison data can be selected from the list, it is possible to receive a selecting instruction indicating an intermediate value, and it is easy to bring the value of the item closer to the ideal value for the user.

It is noted that this embodiment is an example, and does not limit the present disclosures in any way. Therefore, the techniques disclosed in the present specification can be modified within a scope not departing from an argument thereof. For example, the present disclosures are not limited to a scanner, and can be applied to a multifunction device, a copying device, a facsimile device, or the like that includes an image scanning function. The number of PCs and scanners are not limited to the example shown in FIG. 1.

In the present embodiment, the adjustment parameter determining process is a process of the adjustment parameter determining program 44, but the process is not limited to a dedicated program such as the adjustment parameter determining program 44, and may be a part of a processing of the scan application 42 or the scanner driver 43. In this case, the scan application 42 and the scanner driver 43 are examples of a program.

In the present embodiment, the scanning command is transmitted to the scanners 2 to obtain scan data in S102 of the adjustment parameter determining process, but if there is scan data obtained in advance, the scan data may be read out and used to determine the adjustment parameter. In this case, the PC 1 may not be connected to the scanner 2.

If the criterion data does not exist, S101 may be skipped. That is, in the adjustment parameter determining process, the selection is not limited to a selection based on comparison with the criterion data, and the selection may be performed from a plurality of pieces of comparison data. In this case, for example, the image data generated by adjusting the scan data, which is obtained in S103, with default values may be used the criterion data.

Further, in this embodiment, although the eight kinds of temporary parameters are generated and the eight pieces of comparison data and the criterion data are displayed in a list, the number of temporary parameters is not limited to eight. For example, the number of temporary parameters to be generated may be determined according to a size of the image data, a size of the display 18, or the user's designation. In addition, the arrangement of the comparison data to be displayed in the list is not limited to the illustrated example. The image of the criterion data may not be arranged in the center, and the image data of the criterion data and the images of the plurality of pieces of comparison data may be displayed in a separate window. Sizes of the images of the criterion data and the plurality of pieces of comparison data may not be the same.

In the present embodiment, the temporary parameter group is generated by varying only the value of the particular item, but the present disclosures are not limited to this configuration. For example, each temporary parameter should have at least one item of which a value is different from each other, and, in the temporary parameter group, an item of which a value is to be varied is randomly selected.

In addition, the reference value used to generate the first temporary parameter is not limited to the default value.

In addition, the instruction to narrow the comparison data or selection of a plurality of pieces of comparison data may not be received. Alternatively, the instruction to narrow the comparison data may be received without selecting the comparison data. In this case, for example, the value of the particular item may be varied again without changing the particular item.

In addition, the user's preference may be received in advance, and a value to be assigned to the particular item may be biased according to the preference. For example, when the user desires a brighter image, the comparison data, in which a value of the brightness is varied to the brighter side, may be generated in a larger amount.

Further, in an arbitrary flowchart disclosed in the embodiment, a plurality of processes in an arbitrary plurality of steps can be arbitrarily changed in execution order or can be executed in parallel as long as there is no conflict in the content of the processes.

The processes disclosed in the embodiments may be executed by a single CPU, a plurality of CPUs, hardware such as a ASIC, or combinations of them. In addition, the processes disclosed in the embodiment can be realized in various modes such as a recording medium in which a program for executing the processing is recorded, a method, or the like.

What is claimed is:

1. A non-transitory computer-readable recording medium for an information processing apparatus, the information processing apparatus having a display, an operation part and a controller, the recording medium containing computer-executable programs causing, when executed by the controller, the information processing apparatus to perform:
   a first obtaining process of obtaining criterion data which is image data to be used as a criterion of image adjustment;
   a second obtaining process of obtaining evaluation data which is image data scanned by a scanner;
   a generating process of generating a plurality of pieces of comparison data by performing an image process of adjusting the evaluation data, the plurality of pieces of comparison data being generated using different adjustment parameters, respectively;
   an associating process of associating each of the plurality of pieces of comparison data generated by the generating process with adjustment parameter used in the image process of generating each of the plurality of pieces of comparison data;
   a displaying process of displaying a list including the criterion data and the plurality of pieces of comparison data on the display; and
   when a selecting operation of selecting at least one selected data from among the plurality of pieces of comparison data is performed through the operation part, a determining process of determining a scanner-use adjustment parameter, which is an adjustment parameter for the scanner, based on an associated adjustment parameter associated with the at least one selected data, the at least one selected data being comparison data selected from among the plurality of pieces of comparison data, the associated adjustment parameter being the adjustment parameter which is associated with the selected data by the associating process.

2. The non-transitory computer-readable recording medium according to claim 1,
   wherein, in the determining process, an adjustment parameter used by a scanner driver corresponding to the scanner is determined as the scanner-use adjustment parameter.

3. The non-transitory computer-readable recording medium according to claim 1,
   wherein the computer-executable programs cause, when executed by the controller, causes the information processing apparatus to perform an outputting process of outputting the scanner-use adjustment parameter determined by the determining process as a file in a format capable of being processed by a second apparatus, the second apparatus being capable of instructing the scanner to perform a scanning process, the second apparatus being an apparatus configured to adjust image data generated by the scanning process with using the scanner-use adjustment parameter.

4. The non-transitory computer-readable recording medium according to claim 3,
   wherein, in the outputting process, the file is output in a manner that a file transmitting function provided with the information processing apparatus is capable of processing the file.

5. The non-transitory computer-readable recording medium according to claim 4,
   wherein the computer-executable programs cause, when executed by the controller, causes the information processing apparatus to perform a file transmitting process of transmitting the file output in the outputting process to the second apparatus, and
   wherein, in the outputting process, the file in a format, which can be used by the file transmitting process, is output.

6. The non-transitory computer-readable recording medium according to claim 1,
   wherein the computer-executable programs cause, when executed by the controller, causes the information processing apparatus to perform a default value obtaining process of a default value of the scanner-use adjustment parameter corresponding to the scanner, and
   wherein, in the generating process, a value of the adjustment parameter is varied with respect to the default value, and the comparison data corresponding to the adjustment parameter to which the varied value is assigned is generated.

7. The non-transitory computer-readable recording medium according to claim 1,
   wherein, when each of the criterion data and the evaluation data is image data of a monochrome image, the computer-executable programs cause, when executed by the controller, causes the information processing apparatus to perform obtaining an intermediate value of the adjustment parameter based on an intermediate ratio between a ratio of black pixels of the criterion data and a ratio of black pixels of the evaluation data,
   wherein, in the generating process, a value of the adjustment parameter is varied with respect to the intermediate value, and the comparison data corresponding to the adjustment parameter to which the varied value is assigned is generated.

8. The non-transitory computer-readable recording medium according to claim 1,
   wherein, when a final selecting operation of determining a particular data from among the plurality of pieces of comparison data is not performed through the operation part after the selecting operation has been performed, the computer-executable programs cause, when executed by the controller, causes the information processing apparatus to perform the generating process of varying the value of the adjustment parameter with respect to a value of the associated adjustment parameter which is associated with the at least one selected data selected by the selecting operation, and generating the comparison data corresponding to the varied value of the adjustment parameter, and wherein, when the final selecting operation is performed through the operation part after the selecting operation has been performed, the computer-executable programs cause, when executed by the controller, causes the information processing apparatus to perform, in the determining process, determining the scanner-use adjustment parameter based on the associated adjustment parameter associated with the particular data determined by the final selecting operation.

9. The non-transitory computer-readable recording medium according to claim 1, wherein, in the generating process, the plurality of pieces of comparison data are generated using a plurality of the adjustment parameters, respectively, each of the plurality of adjustment parameters including multiple items, a value of a particular item of the multiple items being different among the plurality of the adjustment parameters, a value of an item other than the particular item of the multiple items being the same among the plurality of the adjustment parameters, and wherein, in the determining process, the value of the particular item of the scanner-use adjustment parameter, which includes multiple items, is determined based on the associated adjustment parameter associated with the selected data.

10. The non-transitory computer-readable recording medium according to claim 9, wherein, when there exists an item, of which a value is not determined, among the multiple items of the scanner-use adjustment parameter after determining the value of the particular item, the computer-executable programs cause, when executed by the controller, causes the information processing apparatus to perform:

setting the item of which the value is not determined to the particular item;

the generating process of newly generating a plurality of pieces of comparison data using the plurality of the adjustment parameters, respectively, each of the plurality of adjustment parameters including the multiple items, a value of the particular item of the multiple items is different among the plurality of the adjustment parameters, a value of an item other than the particular item of the multiple items is the same among the plurality of the adjustment parameters;

performing the associating process, the displaying process and the determining process based on the newly generated plurality of pieces of comparison data; and repeatedly performing the generating process, the associating process, the displaying process and the determining process until there exists no item, of which a value is not determined, among the multiple items of the scanner-use adjustment parameter.

11. The non-transitory computer-readable recording medium according to claim 10, wherein the computer-executable programs cause, when executed by the controller, causes the information processing apparatus to perform each of the generating process, the associating process, the displaying process and the determining process multiple times, the adjustment parameter, which includes multiple items, including a first item related to tone and a second item not related to the tone, wherein, when a value of the first item is not determined among the multiple items, in the generating process, the plurality of pieces of comparison data are generated using the plurality of adjustment parameter including the multiple items, respectively, a value of the first item being different among the plurality of the adjustment parameters, a value of the second item being the same among the plurality of the adjustment parameters, and, in the determining process, the value of the first item is determined based on the associated adjustment parameter associated with the selected data, and wherein, when the value of the first item is determined among the multiple items, in the generating process, the plurality of pieces of comparison data are generated using the plurality of adjustment parameter including the multiple items, respectively, the value of the first item of each of the plurality of the adjustment parameters being the determined value, the value of the second item being different among the plurality of the adjustment parameters, and, in the determining process, the value of the second item is determined based on the associated adjustment parameter associated with the selected data.

12. The non-transitory computer-readable recording medium according to claim 1, wherein, in the selecting process, two or more selected data are capable of being selected from the plurality of pieces of comparison data, and wherein, when two or more pieces of selected data are selected in the selecting process, the scanner-use adjustment parameter is determined, in the determining process, based on the associated adjustment parameter associated with each of the two or more pieces of selected data.

13. The non-transitory computer-readable recording medium according to claim 1, wherein, when a weighting value of the adjustment parameter is input, the scanner-use adjustment parameter is determined by taking the input weighting value into account.

14. The nor-transitory computer-readable recording medium according to claim 1, wherein the computer-executable programs cause, when executed by the controller, causes the information processing apparatus to perform:

a command transmitting process of transmitting a command to instruct execution of scanning when a scanning instruction using the scanner is input; and an adjusting process of adjusting, with the scanner-use adjustment parameter determined in the determining process, image data received from the scanner in response to the command.

15. The non-transitory computer-readable recording medium according to claim 1, wherein the computer-executable programs cause, when executed by the controller, causes the information processing apparatus to perform transmitting a command to instruct execution of scanning when a scanning instruction using the scanner is input, the command including the scanner-use adjustment parameter determined in the determining process, the scanner adjusting image data obtained by the scanning with using the scanner-use adjustment parameter included in the command.

16. An information processing apparatus comprising:
a display;
an operation part; and
a controller configured to perform:
- a first obtaining process of obtaining criterion data which is image data to be used as a criterion of image adjustment;
- a second obtaining process of obtaining evaluation data which is image data scanned by a scanner;
- a generating process of generating a plurality of pieces of comparison data by performing an image process of adjusting the evaluation data, the plurality of pieces of comparison data being generated using different adjustment parameters, respectively;
- an associating process of associating each of the plurality of pieces of comparison data generated by the generating process with adjustment parameter used in the image process of generating each of the plurality of pieces of comparison data;
- a displaying process of displaying a list including the criterion data and the plurality of pieces of comparison data on the display; and
- when a selecting operation of selecting at least one selected data from among the plurality of pieces of comparison data is performed through the operation part, a determining process of determining a scanner-use adjustment parameter, which is an adjustment parameter for the scantier, based on an associated adjustment parameter associated with the at least one selected data, the at least one selected data being comparison data selected from among the plurality of pieces of comparison data, the associated adjustment parameter being the adjustment parameter which is associated with the selected data by the associating process.

* * * * *

UNITED STATES PATENT AND TRADEMARK OFFICE
CERTIFICATE OF CORRECTION

PATENT NO. : 11,503,165 B2
APPLICATION NO. : 17/130765
DATED : November 15, 2022
INVENTOR(S) : Nobuyuki Kamiya Page 1 of 2

It is certified that error appears in the above-identified patent and that said Letters Patent is hereby corrected as shown below:

On the Title Page

(57) Abstract, Line 6 should read:
comparison data by adjusting the evaluation data using a In the Claims Column 15, Claim 1, Line 47 should read:
ating process with an adjustment parameter used in the Column 16, Claim 3, Lines 7 and 8 should read:
wherein the computer-executable programs, when executed by the controller, cause the information Column 16, Claim 5, Lines 26 and 27 should read:
wherein the computer-executable programs, when executed by the controller, cause the information Column 16, Claim 6, Lines 36 and 37 should read:
wherein the computer-executable programs, when executed by the controller, cause the information Column 16, Claim 6, Line 39 should read:
ing process of obtaining a default value of the scanner-use Column 16, Claim 7, Line 51 and 52 should read:
computer-executable programs, when executed by the controller, cause the information processing Column 17, Claim 8, Lines 1 and 2 should read:
the computer-executable programs, when executed by the controller, cause the information Column 17, Claim 8, Line 13 should read:
, when executed by the controller, cause the Signed and Sealed this
Fourth Day of July, 2023

Katherine Kelly Vidal
*Director of the United States Patent and Trademark Office*

CERTIFICATE OF CORRECTION (continued)
U.S. Pat. No. 11,503,165 B2

Column 17, Claim 9, Line 23 should read:
adjustment parameters, respectively, each of the Column 17, Claim 9, Line 26 should read:
being different among the plurality of adjustment Column 17, Claim 9, Line 29 should read:
plurality of adjustment parameters, and Column 17, Claim 10, Line 41 should read:
, when executed by the controller, cause the Column 17, Claim 10, Line 50 should read:
multiple items being different among the plurality of the Column 17, Claim 10, Line 52 should read:
the particular item of the multiple items being the same Column 17, Claim 11, Lines 64 and 65 should read:
wherein the computer-executable programs, when executed by the controller, cause the information Column 18, Claim 14, Lines 49 and 50 should read:
wherein the computer-executable programs, when executed by the controller, cause the information Column 18, Claim 15, Lines 61 and 62 should read:
wherein the computer-executable programs, when executed by the controller, cause the information